2,898,309

2,898,309

ANION EXCHANGE RESINS FROM EPIHALOHYDRIN AND POLYALKYLENEPOLYAMINES

Albert H. Greer, Haddonfield, N.J., assignor to Pfaudler Permutit Inc., New York, N.Y., a corporation of Delaware No Drawing. Application November 8, 1955
Serial No. 545,787

20 Claims. (Cl. 260—2.1)

This application is a continuation-in-part of my prior application, Serial No. 461,286, filed October 8, 1954, now abandoned.

The present invention relates to novel synthetic polymeric anion exchange compositions, and to a novel process for their preparation. This invention also relates to a method for removing both weak and strong anions from an aqueous solution.

More particularly, the novel anion exchange resins of the present invention are quaternary ammonium derivatives of spheroidally-shaped condensation products of an epihalohydrin and a polyalkylenepolyamine which has been quaternized by means of a methyl halide. These small spheroidal- or bead-shaped resins are produced in accordance with the suspension polymerization process to be described and are then subsequently quaternized with a methyl halide to provide a plurality of quaternary ammonium groups.

Anion exchange resins, in order to be satisfactory for use, must be substantially insoluble in water, dilute acids and alkalies. They must be capable of resisting physical transformation, such as undue swelling, or mechanical disintegration, such as spalling or shattering of the resin beads, when in contact with the solution they are used to treat. They should not discharge color during the anion exchange cycle and they should be chemically stable in the presence of the aqueous solutions to be treated and strongly alkaline regeneration solutions. They must also have a high useful or operating capacity for removing anions from aqueous solutions, and be capable of being repeatedly regenerated for reuse when they become exhausted. It is also desirable that in addition to a high operating capacity, the exchange resin shall have a high capacity for removing the weaker anions from solution, such as silica and carbon dioxide. The present invention makes it possible to obtain anion exchange resins which have a significant enhancement in the ability to remove weak anions from solution and physical strength, as well as concomitant improvement in other desirable properties, over those of anion exchange resins produced from polymers of a similar character.

It is an object of the present invention to provide novel anion exchange resins which possess a high capacity for the removal of weak and strong anions from an aqueous solution.

It is another object of the present invention to provide novel anion exchange resins which possess superior basicity values and operating capacities over those of somewhat related anion exchange resins.

It is a further object of the present invention to provide a novel process for increasing the silica removal capacities and operating capacities of quaternized condensation products of an epihalohydrin and a polyalkylenepolyamine.

It is an additional object of the present invention to provide a novel process comprising the treatment of spheroidally-shaped polymeric resins which are condensation products of an epihalohydrin and a polyalkylenepolyamine, which normally have low basicities and low capacities for adsorbing weakly acidic anions, to produce highly basic anion exchange resins of superior physical strength, basicity values and operating capacities.

Other objects will be apparent to those skilled in the art from a reading of the description which follows.

There is described in U.S. Patent No. 2,469,683 of James R. Dudley et al. the preparation of anion exchange resins by condensing an epihalohydrin with a polyalkylenepolyamine in a molecular ratio of at least 2:1, respectively. These condensation products were ground or otherwise subdivided into granular form to place them in suitable condition for ion exchange use. These anion exchange resins provided a significant advancement in the art. They did not, however, possess as high a basicity value i.e., capacity for removal of weak anions, such as silica, bicarbonate and carbonate, as might be desired.

U.S. Patent No. 2,543,666 of Malden W. Michael provided an improvement in some respects over the resins of Dudley Patent No. 2,469,683. The Michael patent proposed to increase the basicity values, or salt-splitting capacities, of the epichlorohydrin-polyalkylene-polyamine resins of the Dudley patent by quaternizing them while in an activated condition with two or more different quaternizing agents, step-wise, and in an alkaline medium. The Michael patent states that the employment of a single quaternizing agent in a two-stop reaction produces no advantage.

While the products of the Michael patent present certain advantages, they possess a number of undesirable features. First of all, it is necessary to employ a substantial quantity of at least two different quaternizing agents in a step-wise fashion. These reagents are rather costly chemicals and consequently the process is an expensive one. It is also necessary to activate the granular condensate of epichlorohydrin and a polyalkylenepolyamine by treatment with alkali. But what is more important, these products also possess an objectionable tendency to discharge color and liberate free epichlorohydrin and polyalkylenepolyamine when employed in an anion exchange column. These quaternized anion exchange resins of the Michael patent, produced from the granular condensation products of an epihalohydrin and a polyalkylenepolyamine described in the Dudley patent, supra, possess other undesirable characteristics. In addition to tending to pack in the exchange column and to produce channeling, they tend to soften and decrepitate. They provide only a slight enhancement in the ability to adsorb weak anions over that of the resins of the Dudley patent.

The anion exchange resins of the present invention are significantly superior over those of these two prior patents. The quaternization of the resins of the present invention may be conducted in a single step with a single quaternizing agent. No activation of the condensation product of the polyalkylene-polyamine and the epihalohydrin is required before quaternization. The products of the present invention provide superior physical properties in that they produce very little packing or channeling of the exchange columns and have significantly superior resistance to softening or decrepitation upon repeated use and regeneration. Neither do the anion exchange resins of the present invention produce any coloring of solutions when used in an operating column, nor do they liberate free epihalohydrin or polyalkylenepolyamine. What is also significant, however, is the fact that the products of the present invention have substantially superior basicity values and operating capacities over similar products prepared by quaternizing activated granular condensation products of an epichlorohydrin and a polyalkylenepolyamine prepared in accordance with the practices of the prior art.

While I do not wish to be bound by any theory of explanation for the superior results obtained when employing the novel anion exchange resins of the present invention, it is believed that one important contributing factor resides in the quaternization of a polymeric condensate of an epihalohydrin and a polyalkylenepolyamine which has been produced in spheroidal or bead form by virtue of its polymerization is a suspended or dispersed state. I believe that it is also important to employ particular quaternizing agents as will be described hereinbelow.

The novel highly basic anion exchange resins of the present invention are prepared in accordance with my novel process. Generally speaking, I first prepare an initial, partial condensate, or precondensate syrup, of an epihalohydrin and an aqueous solution of a polyalkylenepolyamine. Polymerization is permitted to proceed only to the point where a somewhat viscous syrup is produced. The partially condensed, slightly viscous material is then added, with agitation, to a hot, inert, organic, non-solvent liquid containing a small amount of a surface active agent which tends to prevent or minimize the agglomeration or fusion of the desired globules or spheroidal particles which are formed as a result of rapidly stirring or agitating the mixture. The rate of agitation is predetermined to produce a desired particle size. The reaction mixture is heated, with agitation, until solid resin beads are formed as a result of further polymerization. The temperature of the mixture is increased to remove as much of the water contained in the precondensate syrup in the form of an azeotropic mixture with the organic, non-solvent liquid. Heating is then continued to permit the complete polymerization of the resin condensate. The non-solvent is then drained from the spheroids or beads and the spheroidal particles are suspended in an alkaline aqueous medium and quaternized with a methyl halide to produce the highly basic, high operating capacity anion exchange resins of the present invention.

More particularly, the novel method of preparation of the anion exchange resins of the present invention comprises first preparing a liquid, syrupy, partial condensate of an epihalohydrin, and desirably epichlorohydrin, in an aqueous solution containing a polyalkylenepolyamine. The condensed syrup which results is then placed in a suitable reaction vessel equipped with a stirrer, a thermometer, and a distilling column suitable for removing the azeotropic mixture formed from the water and the non-aqueous, organic, non-solvent liquid employed. The precondensate syrup may be added to a hot organic, non-solvent or the organic, non-solvent may be added to the precondensate syrup, as desired. It is desirable to employ a small amount of a surface active agent or other dispersing agent which will prevent or minimize agglomeration of the globules of precondensate syrup. The mixture is heated to a temperature of between about 50° and 135° C., and preferably of about 100° to 125° C., and stirred at such a rate as to produce globules or spheroidal particles of between about 10 to 60 U.S. Standard Screen mesh size. The temperature of the reaction mixture is increased in order to remove as much water as possible in the form of an azeotropic mixture and the temperature increased to complete the polymerization and curing of the resin. The organic, non-solvent is removed and the solid spheroids or beads which are produced are placed in a pressure reactor equipped with a suitable stirrer, a gas inlet tube, a thermometer and gas release valve. An aqueous alkaline medium, such as a suspension of powdered calcium oxide or powdered lime is added and then a measured amount of methyl halide is added to produce methylation. When methyl bromide or methyl iodide is employed, it is not necessary to utilize pressure equipment as methylation is reasonably prompt at atmospheric pressure. If methyl iodide is employed an organic solvent is necessary. The solid quaternized anion exchange resin beads are then separated from the liquid material and washed with water.

It is desirable to use at least 2 mols of epihalohydrin for each mol of polyalkylenepolyamine. Preferably between about 2.5 to 4 mols of epihalohydrin for each mol of polyalkylenepolyamine are employed. In the case of epichlorohydrin and tetraethylenepentamine, I desire to use from about 3 to 3.5 mols of the former to 1 mol of the latter since this produces an anion exchange resin having optimum capacity for the removal of strong and weak anions.

I prefer to mix the precondensate syrup with the liquid, organic, non-solvent in a ratio of between about 1:15, respectively, based upon the weight of syrup, up to a ratio of 1:2 in order to attain the proper size of beads or spheroidal particles required.

In general, I desire that the spheroidal particles of resin shall be of such size that the bulk of the material will pass through a U.S. Standard Sieve Series 10-mesh screen but will be retained by a U.S. Standard Sieve Series 60-mesh screen. Preferably the particles should be within a range of 20- to 50-mesh size.

The amount of methyl halide quaternizing agent to be used should be in excess of the amount required to quaternize the number of equivalent nitrogen atoms in the polyalkylene-polyamine contained in the resin beads. In the case of methylating a condensation product of epichlorohydrin and tetraethylenepentamine containing a 3:1 molecular ratio between the former and the latter, excellent results have been obtained with a molecular ratio of methyl chloride to cured resin beads of 7:1 based upon weight.

I have found that epichlorohydrin is the most desirable of the epihalohydrins for use in producing a polymerized condensate with the polyalkylenepolyamines.

The polyalkylenepolyamines to be used in preparing the polymerizate are desirably the lower polyalkylenepolyamines, such as diethylenetriamine, triethylenetetramine, tetraethylenepentamine, etc., or a polypropylpolyamine, such as iminobispropylamine. Tetraethylenepentamine and iminobispropylamine are particularly suitable.

In employing certain commercial grades of some of the polyalkylenepolyamines which are available on the market, it has been found that the spheres or beads of anion exchange resins produced in accordance with the process of the invention tend to develop fissures or cracks, and the beads may even have a tendency to be crushed easily in the hand. This difficulty has been found to arise particularly with certain batches of commercial grades of iminobispropylamine. In those cases where this difficulty may arise, I found that it may be corrected and the physical characteristics of the resin improved by introducing a heterocyclic amine into the polymerization mixture along with the epihalohydrin and the polyalkylenepolyamine. These heterocyclic amines may be aliphatic or aromatic in nature and they preferably shall contain, as the only functional group, one or more amine groups. While the concentration of the heterocyclic amine employed in the condensation mixture with the epihalohydrin and the polyalkylenepolyamine may vary over a substantial range, best results are obtained where the heterocyclic amine is present in a ratio of at least 0.1 molar up to 1.0 molar when compared to the molar quantity of the polyalkylenepolyamine employed. It has been found that below a molar ratio of 0.1 there is obtained only a slight improvement of the physical characteristics of the resin beads. Above the maximum molar ratio of 1.0 the capacity of the anion exchange resin to remove silica is impaired.

While the theoretical considerations as to why the employment of the heterocyclic amines improves the physical properties of the resultant anion exchange resin beads is not understood, the improvement obtained is substantial and it is possible to employ impure, poorer quality polyalkylenepolyamines without impairing the physical properties of the resulting anion exchange resin. Among the heterocyclic amines which may be employed are pyridine; alpha-, beta- or gamma-picoline or commerical mixtures thereof; the lutidines, such as 2,3-lutidine and 2,4-lutidine or commercially available mixtures thereof; the collidines, such as sym-collidine; piperazine and its derivatives, such as 2,5-dimethylpiperazine and 2,4-dimethylpiperazine; morpholine and its methylated derivatives; and piperidine and its alkylated derivatives, such as 2-methylpiperidine. Among the preferred heterocyclic amines are commercial mixtures of alpha- and beta-picolines which contain some dimethylpyridines. This mixture is not only readily available but is inexpensive and is effected in producing anion exchange resin beads which are hard and transparent.

The organic, non-aqueous, non-solvent reaction medium which may be employed should be a liquid at the reaction temperature range of from about 50° to 135° C., stable to heat, non-reactive with the precondensate syrup of the polyalkylenepolyamine and the epihalohydrin and should have a boiling point which exceeds the temperature of the final curing of the condensate. This reaction medium should also have a viscosity and specific gravity substantially equivalent to that of the precondensate syrup. In general, the specific gravity should be from about 1.1 to 1.5. A single non-solvent material may be used or a mixture of two or more such materials. Among the desirable non-solvents are xylene, tetrachloroethane, orthodichlorobenzene, 1,3-propylenedichloride, trichloroethylene, ethylenedichloride, nitrobenzene, o-nitrotoluene, 1-bromohexane, 1-bromooctane, ethylbenzene, isopropylbenzene. One desirable mixture is a 1:1 mixture by weight of xylene and tetrachloroethylene. However, as has been stated, other mixtures of suitable organic non-solvents which have a similar density and boiling point may be used.

Any surface active agent which will not react with the precondensate syrup or the organic, non-solvent reaction medium or decompose under conditions of polymerization, will suffice as an agent that will prevent agglomeration of the spheroidal particles or globules of polymer. The preferred surface active agents are the non-ionic type including the ethylene oxide addition products of carboxylic acids, amines, amides, or alcohols, etc., containing a higher alkyl group with between about 10 to 18 carbon atoms. Such surface active agents include the reaction product of ethanol stearamide and 8 mols of ethylene oxide, the addition product of oleic acid and 8 mols of ethylene oxide (sold under the trademark "Emulphor O"), the polyethylene glycol-substituted maleic acid esters, the ethylene oxide condensation products of mannitan and sorbitan monoesters of highly fatty acids such as palmitic, stearic and oleic acids, the addition products of octadecylamine with ethylene oxide, of stearoguanamine and ethylene oxide, and the like.

The optimum amount of surface active agent used will vary, depending upon the rate and type of agitation, the organic, non-solvent reaction medium and its density, the desired bead size, etc. The minimum quantity of surface active agent for any particular system is that amount which will keep the resin dispersed in the organic, non-solvent reaction medium; the maximum quantity is dependent upon the desired bead size since, in general, the larger the quantity of surface active agent, the smaller will be the bead produced. However, it has been found that where the ratio of precondensate syrup to organic, non-solvent medium is of the order of 1:2.6 up to 1:4, it is preferred to use about 6% by weight of the organic, non-solvent reaction medium. It has been found that with this concentration of surface active agent, the organic, non-solvent medium may be reused many times by adding only a small additional amount of surface active agent and organic, non-solvent medium to yield the desired particular size of cured resin.

In the quaternization reaction it is preferred that the alkaline medium comprise a suspension of powdered calcium hydroxide. However, sodium hydroxide or potassium hydroxide or other alkali, or a quaternary ammonium base may also be used. These latter materials, however, may cause undue hydrolysis of the methyl halide and thereby curtail the efficiency of the quaternization. The employment of either powdered calcium oxide or powdered calcium hydroxide aqueous suspensions provides products which are not decrepitated. This is one of the advantages of the product of the invention over the products prepared in accordance with the prior art since the prior art products require the use of a strongly alkaline medium, such as a solution of sodium hydroxide or potassium hydroxide, to prevent decrepitation during the subsequent life of the anion exchange beads.

For the purposes of anion exchange it is necessary to first convert the quaternary ammonium anion exchange resin of the present invention to the hydroxide exchanging condition by treating the anion exchange resin with a dilute alkali, such as a 5% aqueous solution of sodium hydroxide.

This invention also comprises the process for removing anions from an aqueous solution, comprising contacting the aqueous solution with the novel basic anion exchange resins of the present invention. The anion exchange resins of the invention should be present in sufficient quantity to remove substantially all the anions from the aqueous solution. This may be done by passing the aqueous solution through a column packed with the anion exchange resins. Adsorbed anions may be removed from the resin and the resin thus regenerated by washing it with dilute alkali, preferably sodium hydroxide, the alkali being such that it will form a soluble salt with the adsorbed anions.

In order to disclose more clearly the nature of the present invention, specific examples illustrating the preparation of the anion exchange resins of the present invention will hereinafter be described. This is done solely by way of example and is intended neither to delineate the scope of the invention nor to limit the ambit of the appended claims.

EXAMPLE 1

A. *Preparation of precondensate syrup*

About 132 gms. of tetraethylenepentamine were added to 326 gms. of water. The solution was cooled and 193 gms. of epichlorohydrin were added drop-wise, with stirring, at such a rate as not to raise the temperature above 50° C. The molecular ratio of epichlorohydrin to tetraethylenepentamine was 3:1. After the addition of all the epichlorohydrin, the mixture was heated for 30 minutes at 50° C. to produce a syrupy liquid.

B. *Preparation of resin beads*

Into a resin flask equipped with a thermometer, a stirrer and a distillation column were introduced 750 ml. of xylene and 750 ml. of tetrachloroethane containing 109.4 gms. of a non-ionic surface active agent, an alkyl phenyl polyethoxy ethanol, sold as "Ni-W" by the Antara Chemicals Division of General Dyestuff Corp. The weight of this surface active agent was 6% of the weight of the mixed xylene and tetrachloroethane. The mixture was then heated to 80° C. until the surface active agent was completely dissolved. The stirrer speed was adjusted to about 185 r.p.m., whereupon 350 gms. of the liquid, syrupy precondensate produced in part A of this example, were poured into the solution. The temperature was increased to 95° C. for 1 hour with continued stirring, whereupon the azeotropic mixture of water and the xylene-tetrachloroethane began to distill off. When no further water distilled from the mixture, the temperature was increased to 125° C. and kept constant for about 3 hours. It was necessary to increase the stirrer speed to reduce the agglomeration of the spheroids to a minimum. The suspending medium was removed from the beads by filtration and the beads were washed with quantities of fresh acetone and air dried. The yield of polymerized resin beads was 189.2 gms. The moisture content of the beads was 12%. The beads so obtained had a particle size wherein approximately 80% by weight of the material passed through a 20-mesh screen but was retained on a 40-mesh screen. This material, when regenerated with sodium hydroxide solution, was found to have a basicity value of 5.0 kgr./cu. ft., an ultimate capacity of 40.7 kgr./cu. ft. and a density of 314 gms./l.

C. *Preparation of quaternized anion exchange resin*

In a stainless steel autoclave equipped with a stirrer, a gas inlet tube, a thermometer, a gas release valve and an external source of heat, were placed 48 gms. of powdered calcium oxide suspended in 2 liters of water. The stirrer was started and 163.4 gms. of the beads obtained in part B were added. The temperature was increased to 50° C. and 136 gms. of gaseous methyl chloride were passed into the mixture at a pressure of about 40–50 p.s.i. over a period of about 5 to 6 hours. At the end of this time the pressure on the autoclave was relieved and the contents discharged into water and the resulting suspension was acidified with dilute hydrochloric acid to a pH of 6. The hard translucent beads obtained were removed from the liquid and washed with water. Upon regeneration with sodium hydroxide the material was found to have a basicity value of 19.6 kgr./cu. ft., an ultimate capacity of 38.8 kgr./cu. ft. and a density of 310 gms./l. The operating capacity was found to be 25 kgr./cu. ft. when using a regeneration solution containing 6 lbs. of sodium hydroxide, as a 5 aqueous solution for each cu. ft. of resin with influent water containing 200 p.p.m. of free mineral acids and 17 p.p.m. of silica. The quaternized anion exchange resins produced by Example 1 of U.S. Patent No. 2,543,666 is described as having a salt-splitting capacity (basicity value) of 6.9 kgr./cu. ft. expressed as calcium carbonate and a silica capacity of 18.5 kgr./cu. ft. expressed in terms of silica. If this silica capacity is converted to the same basis as given above for the product of this example of the present invention, viz., by expressing the silica capacity in terms of calcium carbonate, then the silica capacity would be 7.8 kgr./cu. ft. Thus the product of the present invention has a basicity value of approximately 250% over that described in the aforementioned patent.

EXAMPLE 2

A. *Preparation of precondensate syrup*

About 95 gms. of tetraethylenepentamine were added to 233 gms. of water. The solution was cooled and to this were added drop-wise, with stirring, 138 gms. of epichlorohydrin at such a rate as not to increase the temperature above about 50° C. The molecular ratio of epichlorohydrin to tetraethylenepentamine was 3:1. After the addition of epichlorohydrin was complete the mixture was heated for 30 minutes at 50° C. to produce a syrupy precondensate liquid.

B. *Preparation of resin beads*

In reaction equipment similar to that of part B of Example 1 were placed 730 ml. of xylene and 750 ml. of tetrachloroethane. To this were added 109.4 gms. of surface active agent, "NI–W," the stirrer speed was adjusted to 200 r.p.m. and the mixture was heated to 80° C. Then 175 gms. of the precondensate syrup prepared in part A were added. The temperature was increased to 95° C. at which point distillation of an azeotropic mixture containing water began and this temperature was maintained at 95° C. until no additional water distilled over. The temperature was then increased to 125° C. and maintained at this temperature for 3 hours. The resin beads which resulted were removed by filtration and were air dried. The beads had a basicity value of 4.8 kgr./cu. ft., an ultimate capacity of 45.39 kgr./cu. ft. and a density of 354 gms./l. The resin beads showed the following screen analysis:

| Mesh | 20 | 30 | 40 | 50 |
|---|---|---|---|---|
| Percent | 9.1 | 26.2 | 63.1 | 1.6 |

C. *Preparation of quaternized anion exchange resin*

In equipment similar to that described for part C of Example 1, about 23 gms. of powdered calcium oxide were suspended in 200 ml. of water. To this mixture were added about 73 gms. of the beads obtained from part B of this example. Then 125 gms. of gaseous methyl bromide were passed into the mixture at room temperature over a period of about 6 hours. The reaction mixture was acidified with hydrochloric acid, the resulting beads removed from the mixture by filtration and then washed with water. The hard resin beads were found to have a basicity value of 18.7 kgr./cu. ft., an ultimate capacity of 37.4 kgr./cu. ft., a density of 317 gms./l. and an operating capacity of 20.0 kgr./cu. ft., when using a regeneration solution containing 6 lbs. of sodium hydroxide, as a 5% aqueous solution, for each cu. ft. of resin, with influent water containing 200 p.p.m. of free mineral acids and 17 p.p.m. of silica.

EXAMPLE 3

A. *Preparation of precondensate syrup*

Employing the same procedure as in part A of Example 1, but using 92 gms. of iminobispropylamine in place of the tetraethylenepentamine and 195 gms. of epichlorohydrin, a precondensate syrup was obtained.

B. *Preparation of resin beads*

Employing equipment similar to that of part B of Example 1, 175 gms. of the precondensate syrup obtained in part A of this example were added to a mixture of 375 ml. of xylene and 375 ml. of tetrachloroethane which contained 54.7 gms. of Emulphor ON–870 (an addition product of oleic acid and ethylene oxide). The mixture was stirred at a rate of 200 r.p.m. and the temperature increased to about 80° C. The temperature was then increased to 95° C. for 1 hour during which the water formed from the condensation reaction distilled off as an azeotropic mixture. It was found that during this period the condensed resin gelled very rapidly. The temperature was then increased to 125° C. for 3 hours after which the resin beads which had formed were separated from the mixture by filtration and air dried. The material was found to have a basicity value of 11.5 kgr./cu. ft., an ultimate capacity of 59.5 kgr./cu. ft. and a density of 456 gms./l. The resin beads were found to have the following screen analysis:

| Mesh | 20 | 30 | 40 | 60 | passing through 60. |
|---|---|---|---|---|---|
| Percent | 17.9 | 22.7 | 42.2 | 14.7 | 2.5. |

C. *Preparation of quaternized anion exchange resin*

In equipment similar to that described in part C of Example 1, 22 gms. of powdered calcium oxide were suspended in 200 ml. of water. The agitator was started and 70 gms. of resin beads obtained in part B of this example were added. 120 gms. of gaseous methyl bromide were passed into mixture over a period of 6 hours. The reaction mixture was acidified with hydrochloric acid, the resin beads were filtered and washed with water. Upon regeneration with sodium hydroxide the anion exchange resin beads were found to have a basicity value of 22.9 kgr./cu. ft., an ultimate capacity of 35 kgr./ cu. ft. and a density of 352 gms./l. The operating capacity was found to be 25.0 kgr./cu. ft. when employing a regeneration solution containing 6 lbs of sodium hydroxide, as a 5% aqueous solution, for each cu. ft. of resin, with influent water containing 200 p.p.m. of free mineral acids and 17 p.p.m. of silica.

EXAMPLE 4

A. *Preparation of quaternized anion exchange resin beads*

About 298 gms. of precondensate syrup obtained in part A of Example 1 were charged into a reaction vessel such as that described in part B of Example 1. The stirrer speed was set at 250 r.p.m. and to this were added 637 gms. of a 6% solution of the surface active agent, "NI-W," in a 1:1 mixture of xylene and tetrachloroethane. The reaction mixture was treated in accordance with part B of Example 1 until polymerization was complete. The resulting resin beads had a basicity value upon regeneration with a sodium hydroxide solution of 6.9 kgr./cu.ft., an ultimate capacity of 44.7 kgr./cu. ft. and a density of 336 gms./l. The resin beads were found to have the following screen analysis:

| Mesh | 20 | 30 | 40 | 50 |
|---|---|---|---|---|
| Percent | 13.8 | 20.9 | 47.7 | 17 |

This material, when methylated with methyl chloride in accordance with the procedure of part C of Example 1 was found to have the same characteristics as the anion exchange resin beads produced in Example 1, part C. This example demonstrates that one may produce the resin beads by the addition of the non-solvent medium to the precondensate syrup.

EXAMPLE 5

A. *Preparation of resin beads*

Into a three-neck flask equipped with a stirrer, thermometer, and dropping funnel were placed about 636 ml. of water and 152 grams of commercial iminobispropylamine and 133 grams of 2,5-dimethyl piperazine. The resulting solution was stirred and cooled to 30° C. with a surrounding ice bath. To this solution there was added drop-wise 299 grams of epichlorohydrin during 45 minutes keeping the temperature below 40° C. The molar ratio of epichlorohydrin to iminobispropylamine to 2,5-dimethyl piperazine was 2.8:1:1. Into a two liter glass resin flask equipped with a stirrer, thermometer and distillation head were placed 2800 ml. of commercial orthodichlorobenzene containing 1% by weight of chlorinated rubber. The previously prepared condensate was poured into the suspending medium and allowed to separate. Mechanical stirring was begun at a previously determined stirrer speed to produce a maximum size distribution of between —30+50 mesh. The mixture was heated with a surrounding oil bath. When the temperature reached 105° C., an azeotropic mixture of water and orthodichlorobenzene began to distill. Distillation was continued at 105° C. until most of the water had been removed. At this point all of the beads were definitely well defined. The heating was continued until the temperature reached 125° C. and continued at this temperature for an additional 3 hours. The mixture was cooled, the resin beads filtered from the suspending medium and the resin beads then suspended into a liter of water containing 150 g. of commercial lime. The mixture was then steam distilled with live-steam for about 3–4 hours until all of the orthodichlorobenzene was removed.

B. *Preparation of quaternized anion exchange resin beads*

The entire mixture produced in part A was then introduced into a 4 liter stainless steel autoclave equipped with a propeller agitator, a gas inlet tube, a thermometer, a gas release valve and an external source of heat. The mixture was then methylated with 290 grams of gaseous methyl chloride at 50° C. and at 50–60 p.s.i. pressure. After the addition of the measured amount of methyl chloride the mixture was cooled and removed from the autoclave. The material was acidified with hydrochloric acid until a pH of 3–4 was reached. Upon regenerating the hard translucent beads, whose screen size was such that approximately 95% by weight was retained on a 40 mesh screen, with dilute sodium hydroxide solution the resin had a basicity of 21.0 kgr./cu. ft.; an ultimate capacity of 33.5 kgr./cu. ft.; a density of 267 g./l. and an operating capacity of 27.5 kgr./cu. ft. with a regeneration dosage of 6 lbs./cu. ft. of sodium hydroxide as a 5% aqueous solution.

EXAMPLE 6

A. *Preparation of resin beads*

In a three-neck flask equipped with a stirrer, thermometer, and dropping funnel were placed 318 ml. of water and about 86.5 grams of commercial iminobispropylamine and 31 grams of commercial grade "mixed" picoline. The resulting solution was stirred and cooled to 30° C. with a surrounding ice bath. To this solution there was added dropwise 173 grams of epichlorohydrin during 45 minutes keeping the temperature below 40° C. The molar ratio of epichlorohydrin to iminobispropylamine to mixed picoline was 2.8:1:0.5. Into a two liter glass resin flask equipped with a stirrer, thermometer and distillation head were placed 2800 ml. of commercial orthodichlorobenzene containing 1% by weight of chlorinated rubber. The previously prepared condensate was poured into this suspending medium and allowed to separate. Mechanical stirring was begun at a previously defined stirrer speed to produce a maximum size distribution of between —30+50 mesh. The mixture was heated with a surrounding oil bath. When the temperature reached 105° C. an azeotropic mixture of water and orthodichlorobenzene began to distill. Distillation was continued at 105° C. until most of the water had been removed. At this point all of the beads were definitely well defined. The heating was continued until the temperature reached 125° C. and continued at this temperature for an additional 3 hours. The mixture was cooled, the resin beads filtered from the suspending medium and the resin beads then suspended into a liter of water containing 150 g. of commercial lime. The mixture was then steam distilled with live-steam for about 3–4 hours until all of the orthodichlorobenzene was removed.

B. *Preparation of quaternized anion exchange resin beads*

The entire mixture produced in part A was then introduced into a 4 liter stainless steel autoclave equipped with a propeller agitator, a gas inlet tube, a thermometer, a gas release valve and an external source of heat. The mixture was then methylated with 135 grams of gaseous methyl chloride at 50° C. and at 50–60 p.s.i. pressure. After the addition of the measured amount of methyl chloride the mixture was cooled and removed from the autoclave. The material was acidified with hydrochloric acid until a pH of 3–4 was reached. Upon regenerating the hard translucent beads, whose screen size was such that approximately 95% by weight was retained on a 40 mesh screen, with dilute sodium hydroxide solution the resin had a basicity of 26.2 kgr./cu. ft.; an ultimate capacity of 49.9 kgr./ cu. ft.; a density of 437 g./l. and an operating capacity of 27.0 kgr./cu. ft. with a regeneration dosage of 6 lbs./cu. ft. of sodium hydroxide as a 5% solution.

EVALUATION TESTS

Certain data are given for the products prepared in the above examples which are of value in assessing the usefulness of highly basic anion exchange resins. The methods used for determining those values which are not the subject of standardized tests are described below.

As used in the examples and elsewhere in this specification, the term "basicity value" (sometimes referred to as "salt-splitting capacity") is a measure of the capacity of the anion exchange resin to remove the anions of weak acids. Since the value of a highly basic anion exchange resin may often reside in its ability to remove the anions of weak acids, as well as those of strong acids, this is an important value in determining the performance of any basic anion exchange resin. As expressed here, this value is obtained by passing 270 ml. of a 0.75 normal sodium hydroxide solution through a 16 mm. column containing 40 ml. of the anion exchange resin at a flow rate of approximately 5 ml. per minute. This places the anion exchange resin or polymerizate in the hydroxide exchanging condition. The resin bed is rinsed as free as possible of phenolphthalein alkalinity with distilled water. 750 ml. of 0.5 normal sodium chloride solution is next passed through the resin bed at a flow rate of 7.5 ml. per minute. The column is washed with distilled water. The effluent and washings from the sodium chloride treatment are collected, mixed and titrated with 0.02 normal sulfuric acid solution to a methyl orange endpoint. Since the strongly basic anion exchange resin will remove chloride ion from the sodium chloride solution and convert sodium chloride to sodium hydroxide, this determination permits the calculation of the sodium chloride converted to sodium hydroxide giving the "basicity value" of the anion exchange resin. This sodium chloride splitting value is expressed in kilograins of calcium carbonate per cu. ft. of anion exchange resin. Resins having a high "basicity value" will have a high capacity for the removal of weak acids, such as silicic acid and carbonic acid from solutions.

The term "ultimate capacity" used in the examples and elsewhere in the specification is determined by placing 40 ml. of resin, which has first been placed in the chloride form by passing an excess solution of dilute hydrochloric acid over the resin followed by washing with water, in a column of 16 mm. size and through this column is passed 1,000 ml. of 0.75 normal sodium hydroxide at the rate of 5 ml./min. The resin bed is then washed free of phenolphthalein alkalinity with distilled water. Next 800 ml. of a 0.25 normal hydrochloric sulfuric acid solution (a ratio of 1.5 parts of hydrochloric to 2.5 parts of sulfuric) is passed through the resin bed at a flow rate of 10 ml./min. Next 700 ml. of distilled water is passed through the tube. The effluent is collected and mixed and an aliquot is titrated to determine the residual acid. From this, the total amount of acid adsorbed may be computed in terms of kgr./cu. ft of calcium carbonate which gives the total or ultimate capacity of the resin.

Unless otherwise stated, reference to parts and quantities of materials is intended to be expressed in terms of weight.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A water-insoluble, highly basic anion exchange resin which is prepared by a process comprising quaternizing spheroidally-shaped, solid beads of a condensate of an epihalohydrin and a lower polyalkylenepolyamine with a methyl halide, said resin beads having a particle size of between about 10 and 60 mesh on the U.S. Standard Sieve Series.

2. A water-insoluble, highly basic anion exchange resin as defined by claim 1, wherein the epihalohydrin is epichlorohydrin.

3. A water-insoluble, highly basic anion exchange resin as defined by claim 1, wherein the polyalkylenepolyamine is tetraethylenepentamine.

4. A water-insoluble, highly basic anion exchange resin as defined by claim 1, wherein the polyalkylenepolyamine is iminobispropylamine.

5. A water-insoluble, highly basic anion exchange resin as defined by claim 1, wherein the methyl halide is methyl chloride.

6. A water-insoluble, highly basic anion exchange resin as defined by claim 1, wherein the methyl halide is methyl bromide.

7. A water-insoluble, highly basic anion exchange resin as defined by claim 1, wherein the molecular ratio of epihalohydrin to polyalkylenepolyamine employed in producing the condensate is at least 2 to 1, respectively.

8. A water-insoluble, highly basic anion exchange resin which is prepared by a process comprising condensing an epihalohydrin and a lower polyalkylenepolyamine in an organic, non-aqueous, non-solvent medium so as to produce spheroidally-shaped, solid beads of the condensed resin and quaternizing the resin beads with a methyl halide, said resin beads having a particle size of between about 10 and 60 mesh on the U.S. Standard Sieve Series.

9. A water-insoluble, highly basic anion exchange resin which is prepared by a process comprising partially condensing an epihalohydrin and a lower polyalkylenepolyamine to form a syrupy liquid, dispersing the syrupy partial condensate in an organic, non-aqueous, non-solvent medium and completing the condensation at a temperature from about 50° to 135° C., with agitation, so as to produce spheroidally-shaped, solid beads of the condensed resin and finally quaternizing the solid resin beads with a methyl halide, said resin beads having a particle size of between about 10 and 60 mesh on the U.S. Standard Sieve Series.

10. A water-insoluble, highly basic anion exchange resin as defined by claim 9, wherein the molecular ratio of epihalohydrin to polyalkylenepolyamine employed in producing the condensate is from about 2.5 to 4:1, respectively.

11. A water-insoluble, highly basic anion exchange resin which is prepared by a process comprising partially condensing an epihalohydrin and a lower polyalkylenepolyamine in the presence of a heterocyclic amine to form a syrupy liquid, dispersing the syrupy partial condensate in an organic, non-aqueous, non-solvent medium and completing the condensation at a temperature from about 50° to 135° C., with agitation, so as to produce spheroidally-shaped, solid beads of the condensed resin and finally quaternizing the solid resin beads with a methyl halide; wherein the molar ratio of epihalohydrin to polyalkylenepolyamine employed in producing the condensate is from about 2.5 to 4:1, respectively, and the molar ratio of heterocyclic amine to polyalkylenepolyamine is from about 0.1 to 1.0:1, respectively, said resin beads having a particle size of between about 10 and 60 mesh on the U.S. Standard Sieve Series.

12. A method of removing anions from solutions, which comprises bringing such solutions into contact with the anion exchange resin defined by claim 1.

13. A method of removing anions from solutions, which comprises bringing such solutions into contact with the anion exchange resin defined by claim 8.

14. A process for preparing a water-insoluble, highly basic anion exchange resin, which comprises quaternizing spheroidally-shaped, solid beads of a condensate of an epihalohydrin and a lower polyalkylenepolyamine having a particle size of between about 10 and 60 mesh on the U.S. Standard Sieve Series with a methyl halide.

15. A process for preparing a water-insoluble, highly basic anion exchange resin, which comprises condensing an epihalohydrin and a lower polyalkylenepolyamine in an organic, non-aqueous, non-solvent medium so as to produce spheroidally-shaped, solid beads of the condensed resin having a particle size of between about 10 and 60 mesh on the U.S. Standard Sieve Series and quaternizing the resin beads with a methyl halide.

16. A process for preparing a water-insoluble, highly basic anion exchange resin, which comprises partially condensing an epihalohydrin and a lower polyalkylenepolyamine to form a syrupy liquid, dispersing the syrupy partial condensate as small globules by agitation in an organic, non-aqueous, non-solvent medium and completing the condensation at a temperature of from about 50° to 135° C. so as to produce spheroidally-shaped, solid beads of the condensed resin having a particle size of between about 10 and 60 mesh on the U.S. Standard Sieve Series and finally quaternizing the solid resin beads with a methyl halide.

17. A process as defined by claim 15 for preparing a water-insoluble, highly basic anion exchange resin, wherein the molecular ratio of epichlorohydrin to polyalkylenepolyamine employed in producing the condensate is at least 2 to 1, respectively.

18. A process as defined by claim 15 for preparing a water-insoluble, highly basic anion exchange resin, wherein the molecular ratio of epichlorohydrin to polyalkylenepolyamine employed in producing the condensate is from about 2.5 to 4:1, respectively.

19. A process as defined by claim 15 for producing a water-insoluble, highly basic anion exchange resin, wherein there is also present in the condensation mixture a heterocyclic amine in a molar ratio of from about 0.1 to 1.0 for each mole of polyalkylenepolyamine employed.

20. A process as defined by claim 16, wherein the dispersion of syrupy partial condensate in the organic, non-aqueous, non-solvent medium is agitated at such a rate as to produce spheroidally-shaped, solid beads of condensed resin having a particle size of between about 20 and 50 U.S. Standard Sieve Series mesh size.

References Cited in the file of this patent

UNITED STATES PATENTS

| | | |
|---|---|---|
| 2,469,683 | Dudley et al. | May 10, 1949 |
| 2,540,985 | Jackson | Feb. 6, 1951 |
| 2,543,666 | Michael | Feb. 27, 1951 |
| 2,610,156 | Lundberg | Sept. 9, 1952 |
| 2,616,877 | McMaster | Nov. 4, 1952 |

UNITED STATES PATENT OFFICE

CERTIFICATE OF CORRECTION

Patent No. 2,898,309                              August 4, 1959

Albert H. Greer

It is hereby certified that error appears in the printed specification of the above numbered patent requiring correction and that the said Letters Patent should read as corrected below.

Column 2, line 29, for "two-stop" read -- two-step --; column 3, line 10, for "is a" read -- in a --; column 6, line 54, after "all" insert -- of --; column 7, line 38, for "5" read -- 5% --; column 8, line 6, for "45.39 kgr./cu. ft." read -- 45.3 kgr./cu. ft. --; column 10, line 18, for "In" read -- Into --.

Signed and sealed this 12th day of January 1960.

(SEAL)
Attest:

KARL H. AXLINE                                      ROBERT C. WATSON

Attesting Officer                                 Commissioner of Patents